(12) United States Patent
Dorovsky et al.

(10) Patent No.: US 9,075,167 B2
(45) Date of Patent: Jul. 7, 2015

(54) RESONANCE METHOD OF FINDING PERMEABILITY OF ROCKS FROM PARAMETERS OF RADIAL WAVES

(75) Inventors: Vitaly Nikolaevich Dorovsky, Novosibirsk (RU); Yury Vadimovich Perepechko, Novosibirsk (RU); Alexander Igorevich Fedorov, Novosibirskaya oblast (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 243 days.

(21) Appl. No.: 12/922,529

(22) PCT Filed: Feb. 12, 2010

(86) PCT No.: PCT/RU2010/000061
§ 371 (c)(1),
(2), (4) Date: Dec. 21, 2010

(87) PCT Pub. No.: WO2011/099884
PCT Pub. Date: Aug. 18, 2011

(65) Prior Publication Data
US 2012/0041680 A1    Feb. 16, 2012

(51) Int. Cl.
*G01V 9/02* (2006.01)
*G01N 15/08* (2006.01)
*G06F 19/00* (2011.01)
*G01V 1/50* (2006.01)

(52) U.S. Cl.
CPC ..................................... *G01V 1/50* (2013.01)

(58) Field of Classification Search
CPC .................................................. G01V 1/50

USPC .............................................. 702/12; 367/32
See application file for complete search history.

(56) References Cited

U.S. PATENT DOCUMENTS

| 4,458,245 | A * | 7/1984 | Crosnier et al. ............ 340/853.3 |
| 5,784,333 | A * | 7/1998 | Tang et al. ..................... 367/30 |
| 2004/0090230 | A1* | 5/2004 | Appel et al. ................... 324/307 |
| 2005/0246131 | A1* | 11/2005 | Segal et al. .................... 702/156 |
| 2008/0105426 | A1* | 5/2008 | Di et al. ................... 166/250.02 |
| 2008/0175099 | A1* | 7/2008 | Hawthorn et al. ............... 367/25 |
| 2009/0070042 | A1* | 3/2009 | Birchwood et al. ............ 702/11 |
| 2009/0180350 | A1* | 7/2009 | Dorovsky et al. ............... 367/35 |
| 2010/0027377 | A1* | 2/2010 | Zuercher ......................... 367/73 |

FOREIGN PATENT DOCUMENTS

GB    2060903 A    5/1981

OTHER PUBLICATIONS

McDonald et al., "Global and local optimization using radial basis function response surface models", online Oct. 2006, Applied Mathematical Modelling 31, pp. 2095-2110.*

* cited by examiner

*Primary Examiner* — Andrew Schechter
*Assistant Examiner* — Regis Betsch
(74) *Attorney, Agent, or Firm* — Mossman Kumar & Tyler PC

(57) ABSTRACT

Radial waves are generated in a borehole in a saturated porous earth formation. Measurements are made of the velocity of motion of the formation and the fluid in the formation. The difference in the velocities is indicative of formation permeability.

13 Claims, 5 Drawing Sheets

RESONANCE METHOD OF FINDING PERMEABILITY OF ROCKS FROM PARAMETERS OF RADIAL WAVES

BACKGROUND OF THE DISCLOSURE

1. Field of the Disclosure

The present disclosure pertains to an acoustic logging apparatus for measuring formation permeability using Radial waves.

2. Summary of the Related Art

Acoustic wellbore logging instruments are used to measure motion velocities of earth formations in one or more modes of acoustic energy propagation. Acoustic wellbore logging instruments are typically used in liquid-filled wellbores drilled through the earth formations.

The present disclosure is directed towards a method and apparatus for directly measuring the formation permeability of a porous formation. It makes use of the fact that an elastic wave generated in radial direction has resonances that are sensitive to the formation permeability.

SUMMARY OF THE DISCLOSURE

One embodiment of the disclosure is a method of evaluating an earth formation. The method includes: producing a resonance of a fluid in a borehole; and using a processor for estimating a value of a permeability of the earth formation from a first measurement indicative of a velocity of fluid motion in the borehole at the resonance and a second measurement indicative of the velocity of the formation motion at the resonance.

Another embodiment of the disclosure is an apparatus configured to evaluate an earth formation. The apparatus includes: a device configured to produce a resonance of a fluid in a borehole; and a processor configured to estimate a value of a permeability of the earth formation from a first measurement indicative of a velocity of a fluid motion in the borehole and a second measurement indicative of the velocity of the formation motion at the resonance.

BRIEF DESCRIPTION OF THE FIGURES

For detailed understanding of the present disclosure, references should be made to the following detailed description of exemplary embodiment(s), taken in conjunction with the accompanying drawings, in which like elements have been given like numerals, wherein.

DETAILED DESCRIPTION OF THE EMBODIMENTS

Figure 1:
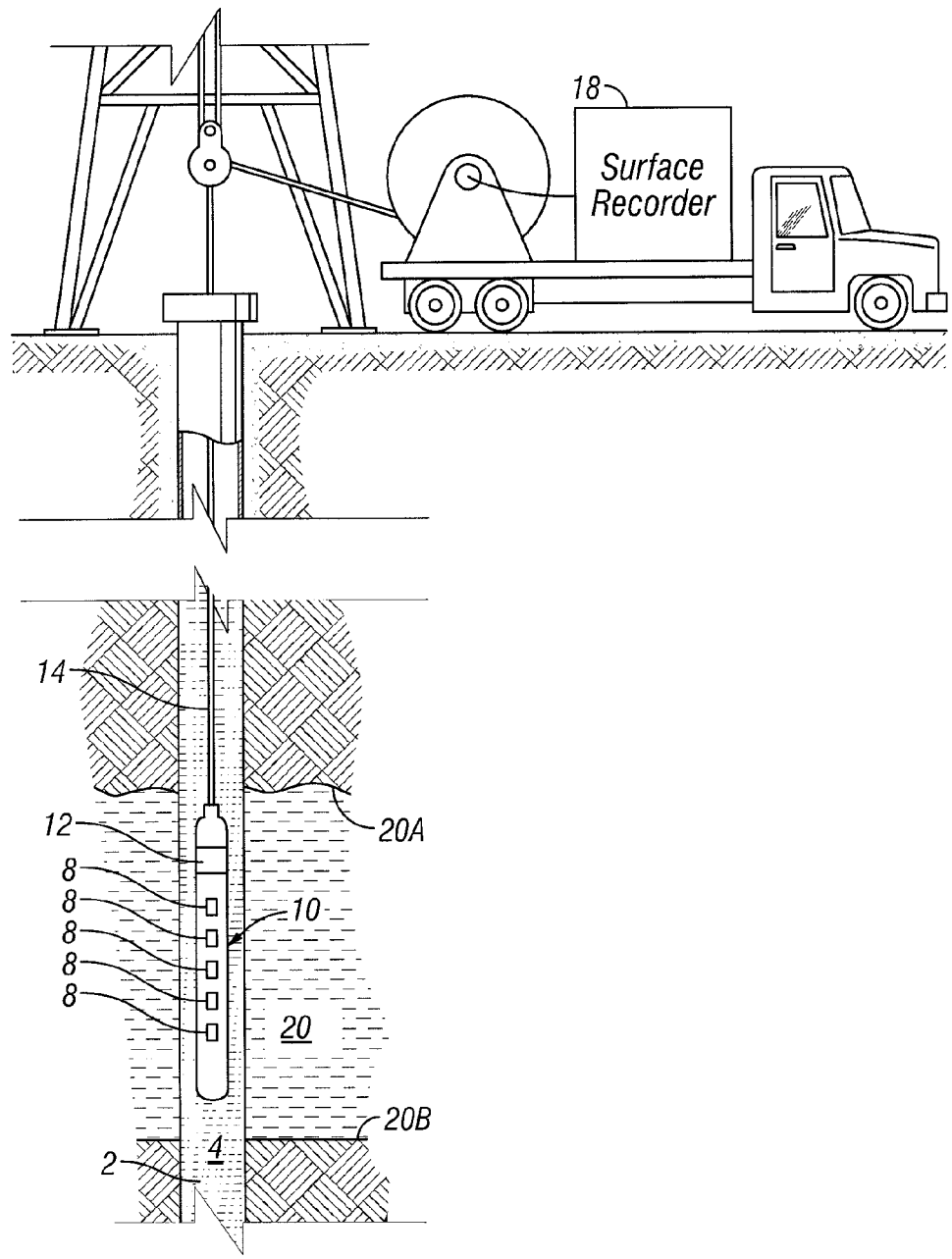
FIG. 1 shows an acoustic well logging instrument as it is used to acquire signals useful with the method of this invention.

FIG. 1 shows an acoustic well logging instrument as it is used to acquire signals suitable for processing according to the method of this disclosure. The instrument 10 is inserted into a wellbore 2 drilled through earth formations 20. The instrument 10 can be inserted into and withdrawn from the wellbore 2 by means of an armored electrical cable 14 spooled from a winch (not shown) or any similar conveyance known in the art.

The wellbore 2 is typically filled with a liquid 4, which can be "drilling mud" or any similar fluid usually used for drilling or completion of wellbores. The instrument includes a plurality of acoustic transmitter 8. The transmitters 8 are periodically energized and emit acoustic energy that radiate from the tool 10. The instrument 10 typically includes a telemetry module, shown generally at 12, which converts the electrical signals from the sensors (discussed with reference to FIG. 2) into a form suitable for recording and transmission over the cable 14 to a surface processsr 18. It should be understood that the number of transmitters 8 as shown in FIG. 1 is only an example and is not meant to limit the invention.

Figure 2:
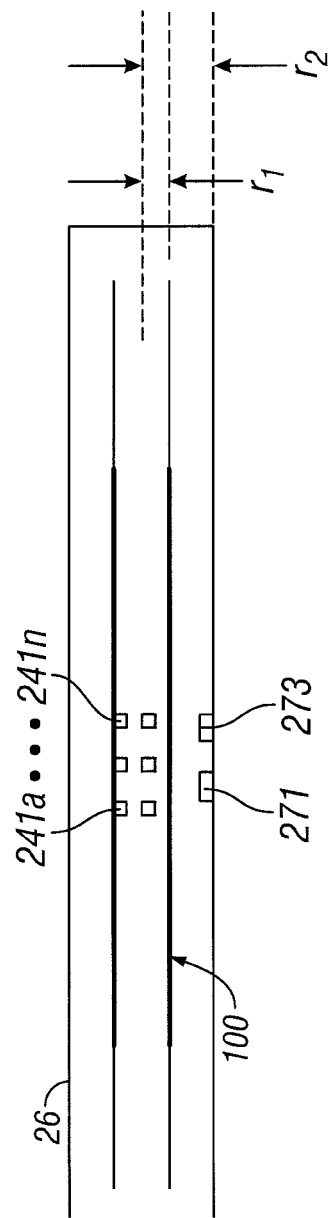
FIG. 2 is an illustration of an exemplary configuration of acoustic transmitters, a flow sensor and a geophone.

Shown in FIG. 2 are an array of acoustic transmitters 241a . . . 241n. The arrays may include elements that are axially and/or circumferentially disposed. While the illustration shows them on a single housing, this is not to be construed as a limitation to the disclosure; a common configuration uses transmitters and receivers on more than one sub. Also shown in the figure is the borehole 26, and the logging tool 100. Also shown are a sensor 271, such as a flow rate sensor, to measure the borehole fluid velocity and a motion sensor such as a geophone 273 to measure the velocity of the deformation of the borehole wall. The acoustic transmitters 241a . . . 241n generate acoustic waves in the borehole.

It should be noted that the disclosure is with reference to a wireline conveyed logging tool. This is not to be construed as a limitation, and the transmitter array for generating Radial waves could be on a bottomhole assembly (BHA) and used for imaging ahead of the borehole. This is discussed in U.S. patent application Ser. No. 12/139,179 of Mathiszik et al., having the same assignee as the present disclosure and the contents of which are incorporated herein by reference.

Figure 3:
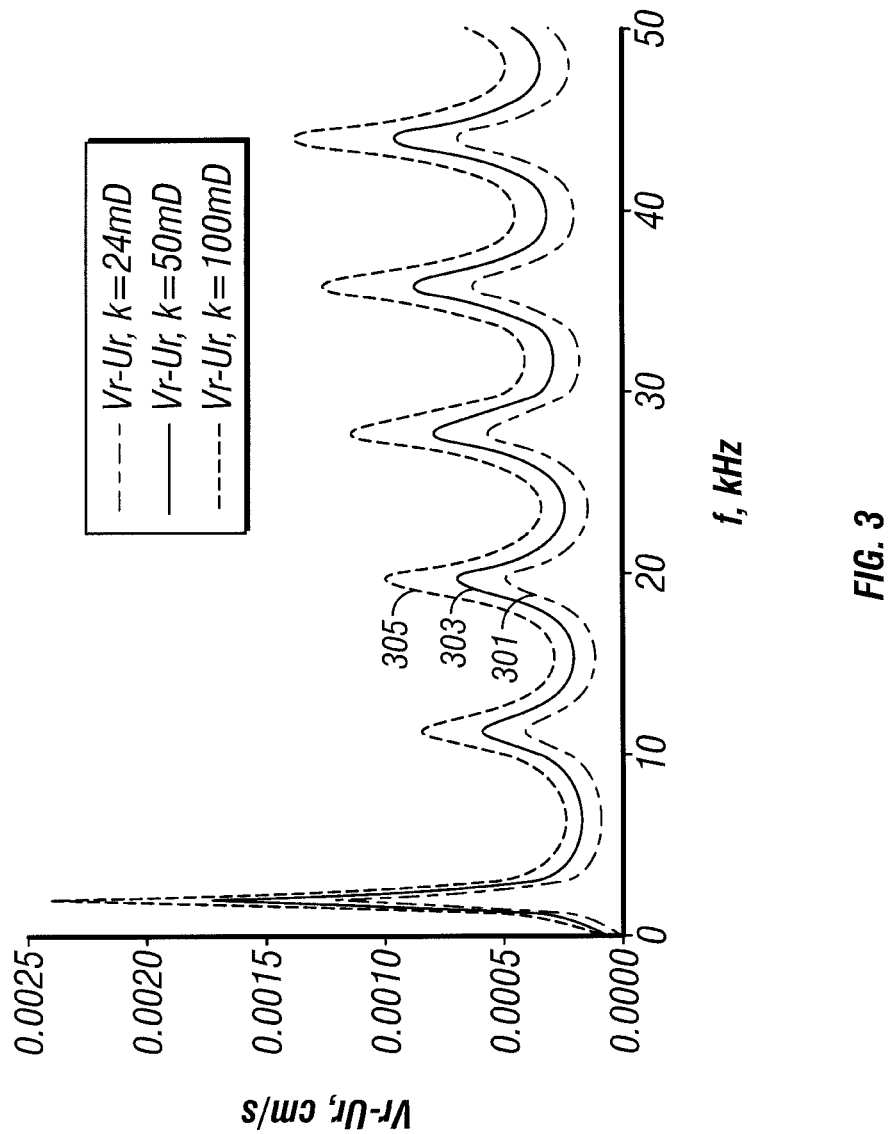
FIG. 3 is a plot of the difference between the velocities of the saturating fluid and the porous matrix motion a function of frequency.

The theoretical analysis (see Appendix I) shows that the oscillation modes of the wellbore space have resonant eigen frequencies. FIG. 3 illustrates the frequency dependence of the difference between velocity amplitudes for the porous matrix motion and saturating fluid next to the borehole boundary at several values of permeability of the saturated porous medium. In FIG. 3, the abscissa is frequency and the ordinate is the difference in velocities for the matrix and the fluid next to the borehole. The velocity difference is plotted for three different formation permeabilities: 100 mD 301, 50 mD 303 and 24 mdD 305. The largest resonance is at a frequency of around 1.966 kHz. The behavior of this resonance as a function of permeability is studied next.

Figure 4:
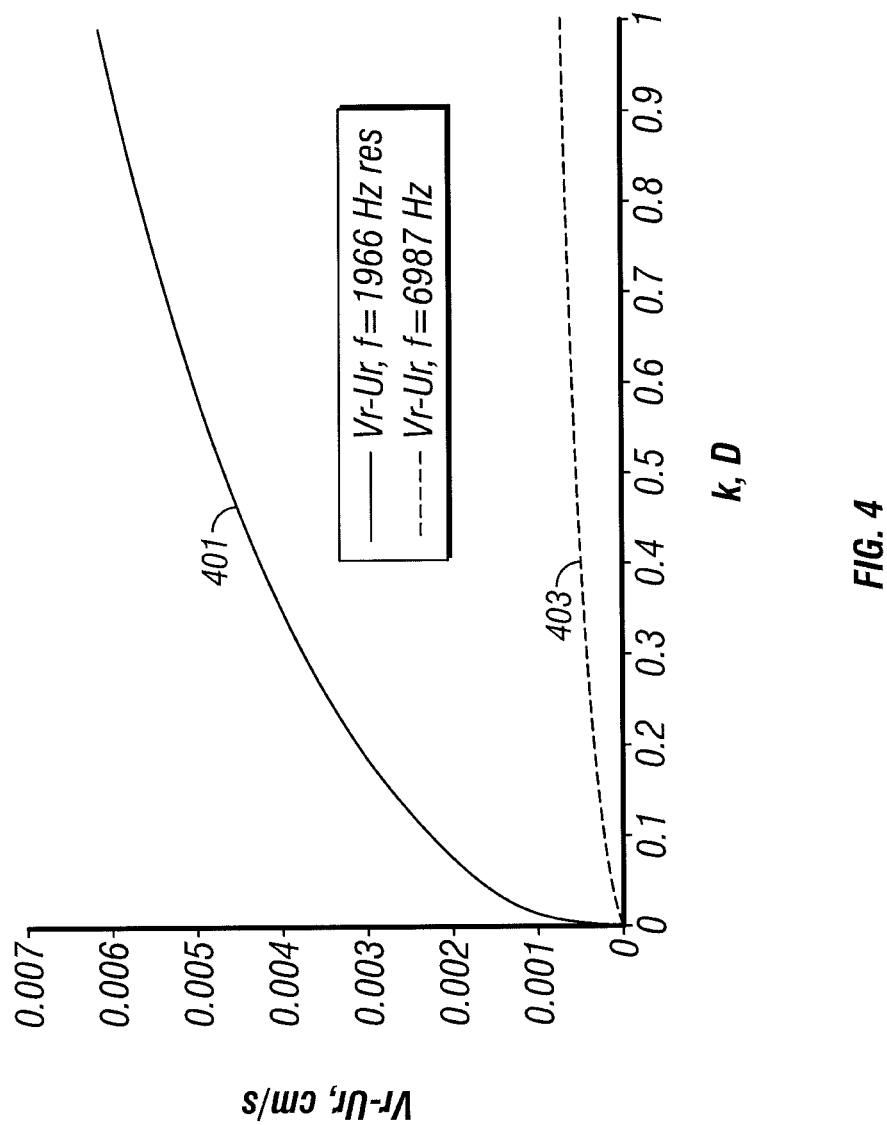
FIG. 4 shows an exemplary dependence of the difference in velocities of the saturating fluid and the porous matrix motion as a function of permeability.

In the neighborhood of the resonance frequency, the velocity difference at $u_r^{(1)} - v_r^{(1)}$ at the interface between the porous medium and borehole fluid, the wave amplitude is quite sensitive to the formation permeability. This is shown in FIG. 4, where the amplitude of the velocity difference is plotted as a function of permeability at the resonant frequency of 1,966 kHz 401 and also at a frequency of 6.987 kHz 403 well away from a resonance.

Figure 5:
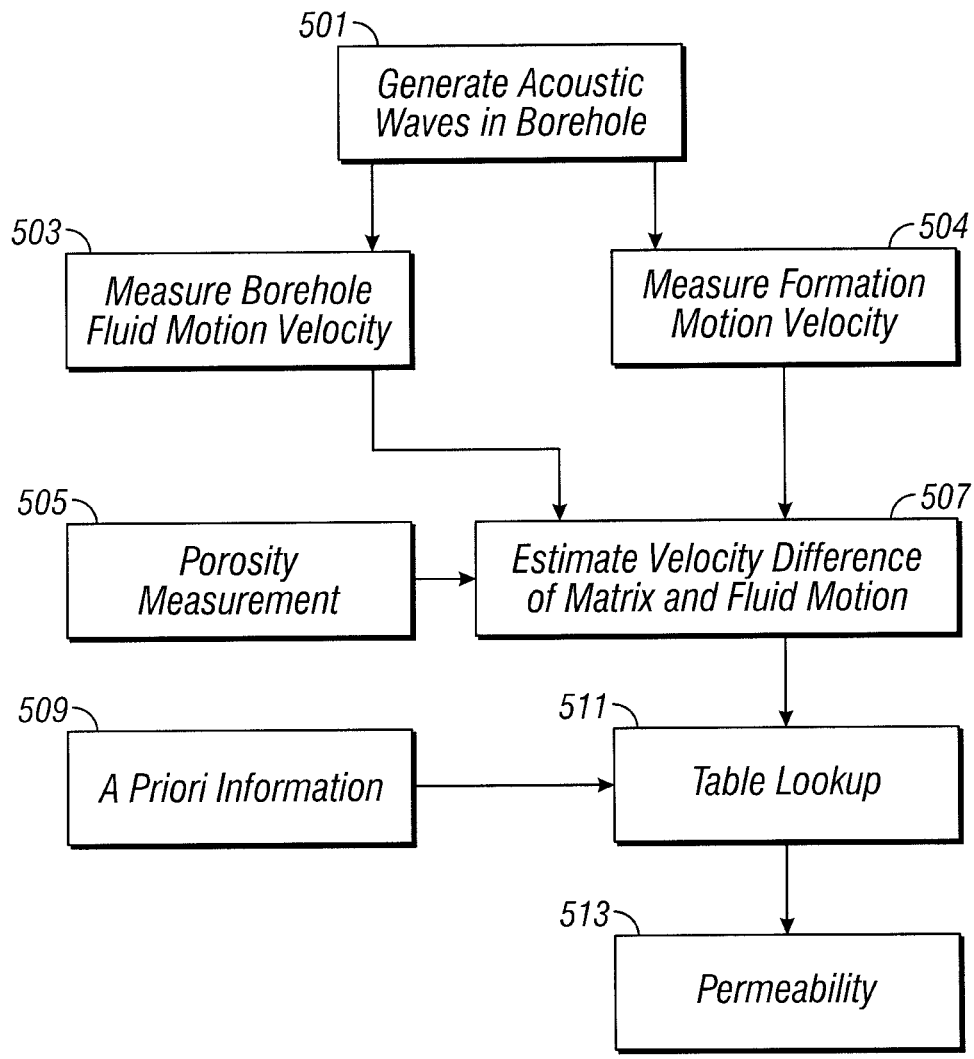
FIG. 5 shows a flow chart of steps of the present disclosure.

This procedure of estimating formation permeability can be understood with reference to the flow chart of FIG. 5. The source of radial acoustic waves (which is to excite the system) is placed in the center of the borehole and activated 501. As discussed below in the Appendix, it is desired to obtain the velocity amplitude difference for the porous matrix and saturating fluid $u_r^{(1)} - v_r^{(1)}$. To this end, independent measurements of the borehole fluid velocity $v_r^{(0)}$ next to the borehole boundary are made 503 as well as of the porous matrix velocity $u_r^{(1)}$ at the borehole boundary 504. Based on these data, and a measurement of porosity φ 505, the desired velocity difference is estimated 507 from the following formula:

$$u_r^{(1)} - v_r^{(1)} = (u_r^{(1)} - v_r^{(0)})/\phi. \qquad (1).$$

This formula is derived from boundary condition (I.28) and is valid only at the surface of the borehole.

The acoustic source is swept through a range of frequencies and the lowest resonance frequency is identified. The resonant frequency is a function of known (or measurable quantities) like the porosity of the formation, velocities of compressional and shear waves in the formation, fluid viscosity, and the borehole geometry. The actual value of the velocity difference is a function of formation permeability (see FIG. 4), so that the formation permeability can be estimated from the measured velocity difference. The relevant derivation is given in the Appendix.

The description above has been in terms of a device conveyed on wireline into a borehole in the earth formation. The method and apparatus described above could also be used in conjunction with a bottomhole assembly conveyed on a drilling tubular into the earth formation. For the purposes of the present disclosure, the BHA and the logging string may be referred to as a "downhole assembly." It should further be noted that while the example shown depicted the transmitter assembly and the receiver assembly on a single tubular, this is not to be construed as a limitation of the disclosure. It is also possible to have a segmented acoustic logging tool to facilitate conveyance in the borehole. Once the formation permeability has been estimated, it can be used for further reservoir development operations.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation velocities and boundary locations may be recorded on a suitable medium and used for subsequent processing upon retrieval of the BHA. The determined formation permeability may further be telemetered uphole for display and analysis.

Appendix I

To measure permeability in the saturated porous medium, a theory that describes the radial waves based on the linearized version of filtration theory is used To describe the acoustic field in fluid, the following equation is used:

$$\ddot{v} - c_{p0}^2 \nabla \mathrm{div}\, v = 0. \qquad (I.1)$$

Here $c_{p0}$ is the velocity of sound in borehole fluid.

Velocities u, v of the matrix of the porous medium and the fluid contained therein satisfy equations $$\ddot{u} - c_t^2 \Delta u - a_1 \nabla\, \mathrm{div}\, u + a_2 \nabla\, \mathrm{div}\, v + \frac{\rho_l}{\rho_s} b(\dot{u} - \dot{v}) = 0, \text{ and} \qquad (I.2),$$

$$\ddot{v} + a_3 \nabla\, \mathrm{div}\, u - a_4 \nabla\, \mathrm{div}\, v - b(\dot{u} - \dot{v}) = 0. \qquad (I.3)$$

Here $\rho_l$, $\rho_s$ are partial densities of the saturating fluid and the porous matrix, respectively, $\rho = \rho_l + \rho_s$ is density of the saturated porous medium. The dissipative coefficient is $b = \rho_l \chi = \eta/(k\rho)$, where $\eta$ is dynamic viscosity the saturating fluid, k is permeability. Equation coefficients $a_i$ (i=1, . . . , 4) are determined by the elasticity moduli λ, μ, and γ:

$$a_1 = \frac{1}{\rho_s}\left(\frac{\rho_s^2}{\rho^2}\gamma + \frac{\rho_l^2}{\rho^2}K + \frac{1}{3}\mu\right),\ a_2 = \frac{\rho_l}{\rho_s}\left(\frac{\rho_l}{\rho^2}K - \frac{\rho_s}{\rho^2}\gamma\right), \qquad (I.4)$$

$$a_3 = \frac{\rho_l}{\rho^2}K - \frac{\rho_s}{\rho^2}\gamma,\ a_4 = \frac{\rho_l}{\rho^2}K + \frac{\rho_l}{\rho^2}\gamma, \qquad (I.5)$$

where K=λ+2μ/3. The three elasticity moduli λ, μ, and γ are determined by three measurable velocities of sound in saturated porous medium (two compressional velocities $c_{p1}$, $c_{p2}$ and one shear velocity $c_t$) The two compressional waves are sometimes referred to as the Biot waves of the first kind and the second kind.

$$\mu = \rho_s c_t^2, \qquad (I.6)$$

$$K = \frac{1}{2}\frac{\rho_s}{\rho_l}\left(\rho c_{p1}^2 + \rho c_{p2}^2 - \frac{8}{3}\rho_l c_t^2 - \sqrt{(\rho c_{p1}^2 - \rho c_{p2}^2)^2 - \frac{64}{9}\rho_s \rho_l c_t^4}\right), \qquad (I.7)$$

$$\gamma = \frac{1}{2}\left(\rho c_{p1}^2 + \rho c_{p2}^2 - \frac{8}{3}\rho_s c_t^2 + \sqrt{(\rho c_{p1}^2 - \rho c_{p2}^2)^2 - \frac{64}{9}\rho_s \rho_l c_t^4}\right). \qquad (I.8)$$

The acoustic source in the system is a finite-size harmonic pressure generator $p = P_0 e^{-i\omega t}$ located in the center of the wellbore. The acoustic response of the system under study is also harmonic $$(u, v) \to (u, v) e^{-i\omega t}. \qquad (I.9)$$

The latter fact makes it possible to keep the following coordinate dependence of equations (I.1, I.2, I.3) in Fourier amplitudes of the radial wave velocities $u(u_r, 0, 0)$, $v(v_r, 0, 0)$:

$$\lambda_0 \Delta v + v = 0,\ (r_1 < r < r_2), \qquad (I.10)$$

and $$\bar{a}_0 \Delta u - \bar{a}_2 \Delta v + (1 + \epsilon \bar{b}) u - \delta \bar{b} v = 0,\ (r_2 < r < \infty), \qquad (I.11)$$

$$-\bar{a}_3 \Delta u + \bar{a}_4 \Delta v - \bar{b} u + (1 + \bar{b}) v = 0,\ (r_2 < r < \infty). \qquad (I.12)$$

These are dimensionless equations where velocities u, v are in units of $c_t$, coordinates are in units of $c_t/\omega$; coefficients are transformed: $\lambda_0 = c_{p0}^2/c_t^2$, $\bar{a}_i = a_i/c_t^2$ (i=0, . . . , 4), $\bar{b} = ib/\omega$; $\epsilon = \rho_l/\rho_s$, $\bar{a}_0 = \bar{a}_1 + 1$.

Let us find common solutions to equations (I.10-I.12). First, to the equations describing the acoustic field in porous medium to the diagonal form, the set (I.11-I.12) could be conveniently expressed in the matrix form.

$$A \Delta U + W U = 0 \qquad (I.14)$$

Here $$U = \begin{pmatrix} u_r \\ v_r \end{pmatrix},\ A = \begin{pmatrix} \bar{a}_0 & -\bar{a}_2 \\ -\bar{a}_3 & \bar{a}_4 \end{pmatrix},\ W = \begin{pmatrix} (1 + \epsilon \bar{b}) & -\epsilon \bar{b} \\ -\bar{b} & (1 + \bar{b}) \end{pmatrix}. \qquad (I.15)$$

Having multiplied set (I.12) by the inverse matrix $$W^{-1} = \begin{pmatrix} \frac{(1+\bar{b})}{\det W} & \frac{\varepsilon \bar{b}}{\det W} \\ \frac{\bar{b}}{\det W} & \frac{(1+\varepsilon\bar{b})}{\det W} \end{pmatrix},$$

where $\det W = 1 + (1+\varepsilon)\bar{b}$, we arrive at the set of equations:

$$H\Delta U + U = 0 \tag{I.16}$$

with this matrix of coefficients: $H = W^{-1} A$ $$h_{11} = ((1+\bar{b})\bar{a}_0 - \varepsilon\bar{b}\bar{a}_3)/\det W, \; h_{12} = (-(1+\bar{b})\bar{a}_2 + \varepsilon\bar{b}\bar{a}_4)/\det W,$$

$$h_{21} = (\bar{b}\bar{a}_0 - (1+\varepsilon\bar{b})\bar{a}_3)/\det W, \; h_{22} = (-\bar{b}\bar{a}_2 + (1+\varepsilon\bar{b})\bar{a}_4)/\det W. \tag{I.17}$$

To reduce set (I.14) to the diagonal form, we multiply it by the matrix R, as found from this problem solution for the eigenvalues of the matrix H:

$$HR = R\Lambda \tag{I.18}$$

as the matrix compiled of the right-hand side eigenvectors, $$R = \left( \begin{pmatrix} R_1 \\ R_3 \end{pmatrix} \begin{pmatrix} R_2 \\ R_4 \end{pmatrix} \right).$$

Components of the transform matrix R (or eigenvectors of the matrix H) have the following:

$$R_1 = 1, \; R_2 = (\lambda_2 - h_{22})/h_{21}, \; R_3 = h_{21}/(\lambda_1 - h_{22}), \; R_4 = 1. \tag{I.19}$$

The matrix of eigenvectors $$\Lambda = \begin{pmatrix} \lambda_1 & 0 \\ 0 & \lambda_2 \end{pmatrix}$$

is diagonal, so that $R^{-1} H R = \Lambda$, and eigenvalues $\lambda_1, \lambda_2$ can be expressed as follows:

$$\lambda_{1,2} = \frac{1}{2}(h_{11} + h_{22}) \pm \sqrt{\frac{1}{2}(h_{11} + h_{22})^2 - (h_{11}h_{22} - h_{12}h_{21})}. \tag{I.20}$$

The vector-column of functions is transformed as follows:

$$R^{-1} U = V, \text{ where } V = \begin{pmatrix} v_1 \\ v_2 \end{pmatrix}. \tag{I.21}$$

After transformation, set (I.16) becomes diagonal:

$$\Lambda \Delta V + V = 0, \tag{I.22}$$

or, in coordinate notations (prime denotes the derivative with respect to the radius):

$$v_1'' + \frac{1}{r} v_1' + \left( \frac{1}{\lambda_1} - \frac{1}{r^2} \right) v_1 = 0 \tag{I.23}$$

$$v_2'' + \frac{1}{r} v_2' + \left( \frac{1}{\lambda_2} - \frac{1}{r^2} \right) v_2 = 0 \tag{I.24}$$

The initial velocities can be expressed via functions $v_1, v_2$ (I.21):

$$u_r = v_1 + R_2 v_2, \; v_r = R_3 v_1 + v_2. \tag{I.25}$$

Acoustic equation (I.10) for the borehole fluid can be expressed similarly:

$$v_r'' + \frac{1}{r} v_r' + \left( \frac{1}{\lambda_0} - \frac{1}{r^2} \right) v_r = 0. \tag{I.26}$$

The set of equations (I.23, I.24, I.26) taking into account (I.25) describes the acoustic field of the radial waves in the wellbore and in the formation beyond the wellbore, as shown in FIG. 2. The boundary conditions for this geometry (in the dimensionless case) are the following (the index in brackets denotes values pertaining to the fluid $^{(0)}$ and the saturated porous medium $^{(1)}$);

1) On the surface of the source exciting the oscillations in the fluid, ($r = r_1$, FIG. 2), a harmonic source is set:

$$p^{(0)} = \bar{P}_0 \tag{I.27}$$

2) On the interface between the borehole and the saturated porous medium ($r = r_2$, FIG. 1), continuity of the medium is assumed, as well as continuity of the full stress tensors ($\Sigma_{rr}^{(1)}$, $\Sigma_{rr}^{(0)}$) and the partial pressures:

$$(1 - \phi) u_r^{(1)} + \phi v_r^{(1)} = v_r^{(0)}, \tag{I.28}$$

$$\Sigma_{rr}^{(1)} = \Sigma_{rr}^{(0)}, \tag{I.29}$$

$$\frac{p^{(1)}}{\rho^{(1)}} - \kappa \frac{\rho^{(1)}}{\rho_s^{(1)}} \bar{b}(\varphi_u^{(1)} - \varphi_v^{(1)}) = \frac{p^{(0)}}{\rho^{(0)}}. \tag{I.30}$$

Here $\phi$ is porosity, $\phi_{u,v}$ are potentials which determine the velocity of the radial waves in the medium $u = \nabla \phi_u$, $v = \nabla \phi_v$, $\kappa$ is a conditional coefficient which enables us to change the friction force at he boundary, $\bar{P}_0 = P_0/(\rho_s c_t^2)$. The final boundary condition follows from a more general continuity condition for the partial stress tensor in fluid $\Sigma_{rr}^{l(1)} = \phi \Sigma_{rr}^{(0)} (\Sigma_{rr}^{(1)} = \Sigma_{rr}^{s(1)} + \Sigma_{rr}^{l(1)})$.

Components of stress tensors and pressure are determined via displacement velocities as follows:

$$-\dot{p}^{(1)} = \pi_1 \operatorname{div} u^{(1)} + \pi_2 \operatorname{div} v^{(1)}, \tag{I.31}$$

$$\dot{\Sigma}_{rr}^{(1)} = \pi_3 \operatorname{div} u^{(1)} + \pi_4 \operatorname{div} v^{(1)} + 2 u_r', \tag{I.32}$$

$$\dot{\Sigma}_{rr}^{(0)} = -\dot{p}^{(0)} = \pi_0 \operatorname{div} v^{(0)}, \tag{I.33}$$

where the following is determined:

$$\pi_1 = \left( \frac{\rho_s}{\rho} \gamma - \frac{\rho_l}{\rho} K \right) / (\rho_s c_t^2), \; \pi_2 = \left( \frac{\rho_l}{\rho} \gamma + \frac{\rho_l}{\rho} K \right) / (\rho_s c_t^2), \tag{I.34}$$

$$\pi_3 = \left( \frac{\rho_s}{\rho} \gamma - \frac{2}{3} \mu \right) / (\rho_s c_t^2), \; \pi_4 = \left( \frac{\rho_l}{\rho} \gamma \right) / (\rho_s c_t^2), \tag{I.35}$$

$$\pi_0 = \rho^{(0)} c_{p0}^2 / (\rho_s c_t^2). \tag{I.36}$$

Set of equations (I.23, I.24, I.26) with boundary conditions (I.27-I.30) for geometry shown in FIG. 1 has a solution that is expressed via the Hankel functions $H_\alpha^{(1)}(z)$, $H_\alpha^{(2)}(z)$.

In the saturated porous medium, this solution in a dimensionless form is: for pressure $$p^{(0)} = -iB_1(\pi_1+\pi_2 R_3)H_1^{(1)}(r/\sqrt{\lambda_1})/\sqrt{\lambda_1} - iB_2(\pi_1 R_2+\rho_2)H_1^{(1)}(r/\sqrt{\lambda_2})/\sqrt{\lambda_2}, \quad (\text{I.37})$$

for the solid matrix velocities and velocities of the saturating fluid:

$$u_r^{(1)} = B_1 H_1^{(1)}(r/\sqrt{\lambda_1}) + B_2 R_2 H_1^{(1)}(r/\sqrt{\lambda_2}), \quad (\text{I.38})$$

$$v_r^{(1)} = B_1 R_3 H_1^{(1)}(r/\sqrt{\lambda_1}) + B_2 H_1^{(1)}(r/\sqrt{\lambda_2}), \quad (\text{I.39})$$

and, consequently, for the difference of the matrix and fluid velocities:

$$u_r^{(1)} - v_r^{(1)} = B_1(1-R_3)H_1^{(1)}(r/\sqrt{\lambda_1}) + B_2(R_2-1)H_1^{(1)}(r/\sqrt{\lambda_2}), \quad (\text{I.40})$$

In the wellbore, this solution in a dimensionless form is: for pressure in fluid)

$$p^{(0)} = -iB_0 \pi_0 H_1^{(1)}(r/\sqrt{\lambda_0})/\sqrt{\lambda_0} - iC_0 \pi_0 H_1^{(2)}(r/\sqrt{\lambda_0})/\sqrt{\lambda_0}, \quad (\text{I.41})$$

for the fluid velocity $$v_r^{(0)} = B_0 H_1^{(1)}(r/\sqrt{\lambda_0}) + C_0 H_1^{(2)}(r/\sqrt{\lambda_0}). \quad (\text{I.42})$$

Integration constants $B_1$, $B_2$, $B_0$, $C_0$ are determined by the condition that boundary problem solutions (I.20, I.21, I.23) are to satisfy boundary conditions (I.24-I.27). Substituting solutions (I.34-I.40) into boundary conditions (I.24-I.27), we arrive at this set:

$$G\Xi = P, \quad (\text{I.43})$$

where one can see the column vector of the integration constants $\Xi$, the source part P, and the coefficient matrix G:

$$\Xi = \begin{pmatrix} B_1 \\ B_2 \\ B_0 \\ C_0 \end{pmatrix}, P = \begin{pmatrix} \overline{P}_0 \\ 0 \\ 0 \\ 0 \end{pmatrix}, G = \begin{pmatrix} g_{11} & g_{12} & g_{13} & g_{14} \\ g_{21} & g_{22} & g_{23} & g_{24} \\ g_{31} & g_{32} & g_{33} & g_{34} \\ g_{41} & g_{42} & g_{43} & g_{44} \end{pmatrix}, \quad (\text{I.44})$$

where $$g_{11} 0, g_{12} = 0, \quad (\text{I.45})$$

$$g_{13} = \pi_0 H_0^{(1)}(r_1/\sqrt{\lambda_0})/\sqrt{\lambda_0}, g_{14} = \pi_0 H_0^{(2)}(r_1/\sqrt{\lambda_0})/\sqrt{\lambda_0}, \quad (\text{I.46})$$

$$g_{21} = ((1-\phi)+\phi R_3)H_1^{(1)}(r_2/\sqrt{\lambda_1}), g_{22} = ((1-\phi)R_2+\phi)H_1^{(1)}(r_2/\sqrt{\lambda_2}), \quad (\text{I.47})$$

$$g_{23} = -H_1^{(1)}(r_2/\sqrt{\lambda_0}), g_{24} = -H_1^{(2)}(r_2/\sqrt{\lambda_0}), \quad (\text{I.48})$$

$$g_{31} = (\pi_3+\pi_4 R_3+2)H_0^{(1)}(r_2/\sqrt{\lambda_1})/\sqrt{\lambda_1} - 2H_1^{(1)}(r_2/\sqrt{\lambda_1})/r_2, \quad (\text{I.49})$$

$$g_{32} = (\pi_3 R_2+\pi_4+2)H_0^{(1)}(r_2/\sqrt{\lambda_2})/\sqrt{\lambda_2} - 2R_2 H_1^{(1)}(r_2/\sqrt{\lambda_2})/r_2, \quad (\text{I.50})$$

$$g_{33} = -\pi_0 H_0^{(1)}(r_2/\sqrt{\lambda_0})/\sqrt{\lambda_0}, g_{34} = \pi_0 H_0^{(2)}(r_2/\sqrt{\lambda_0})/\sqrt{\lambda_0}, \quad (\text{I.51})$$

$$g_{41} = ((\pi_1+\pi_2 R_3)\lambda_1 + i\kappa \overline{b}(1-R_3))H_0^{(1)}(r_2/\sqrt{\lambda_1})/\sqrt{\lambda_1}, \quad (\text{I.52})$$

$$g_{42} = ((\pi_1 R_2+\pi_2)\lambda_2 + i\kappa \overline{b}(R_2-1))H_0^{(1)}(r_2/\sqrt{\lambda_2})/\sqrt{\lambda_2}, \quad (\text{I.53})$$

$$g_{43} = -(\rho^{(1)}/\rho^{(0)})\pi_0 H_0^{(1)}(r_2/\sqrt{\lambda_0})/\sqrt{\lambda_0}, \quad (\text{I.54})$$

$$g_{44} = -(\rho^{(1)}/\rho^{(0)})\pi_0 H_0^{(2)}(r_2/\sqrt{\lambda_0})/\sqrt{\lambda_0}, \quad (\text{I.55})$$

The invention claimed is:

1. A method of evaluating an earth formation comprising a saturated porous medium, the formation intersected by a borehole filled with a fluid including a liquid, the method comprising:

producing a resonance associated with i) motion of the fluid in the borehole at an interface between the porous medium and the fluid and ii) motion of the formation at the interface;

using a first sensor to make a first acoustic measurement of a velocity of motion of the formation and using a second sensor to make a second acoustic measurement of a velocity of motion of the fluid in the borehole; and using a processor for estimating a value of a permeability of the earth formation using a difference between an amplitude of the first acoustic measurement and an amplitude of the second acoustic measurement.

2. The method of claim 1 wherein producing the resonance further comprises using a swept frequency source in the borehole and identifying a frequency at which a difference between the first measurement and the second measurement is a maximum.

3. The method of claim 2 wherein estimating the value of the permeability further comprises using at least one of: (i) a porosity of the formation, (ii) a viscosity of a fluid in the borehole, (iii) a geometry of the borehole, (iv) a velocity of a compressional wave in the formation, and (v) a velocity of a shear wave in the formation.

4. The method of claim 2 wherein using the swept frequency source further comprises using a monopole source.

5. The method of claim 2 further comprising conveying the swept frequency source into the borehole on a conveyance device selected from: (i) a wireline, and (ii) a drilling tubular.

6. The method of claim 1 wherein the first sensor comprises a geophone for measuring the velocity of the formation and wherein the second sensor comprises a flow rate sensor to measure the fluid velocity.

7. The method of claim 1 wherein estimating the value of the permeability of the earth formation comprises using a relationship between i) the difference, ii) a velocity amplitude difference between the velocity of motion of the formation and a velocity of motion of the fluid in the formation, and iii) a porosity of the formation.

8. An apparatus configured to evaluate an earth formation comprising a saturated porous medium, the formation intersected by a borehole filled with a fluid including a liquid, the apparatus comprising:

a device configured to produce a resonance associated with i) motion of the fluid in the borehole at an interface between the porous medium and the fluid and ii) motion of the formation at the interface;

a first sensor to make a first acoustic measurement of a velocity of motion of the formation;

a second sensor to make a second acoustic measurement of a velocity of motion of the fluid in the borehole; and a processor configured to:

use the first sensor to make a first acoustic measurement of a velocity of motion of the formation and use the second sensor to make a second acoustic measurement of a velocity of motion of the fluid in the borehole; and estimate a value of a permeability of the earth formation using a difference between an amplitude of the first acoustic measurement and an amplitude of the second acoustic measurement.

9. The apparatus of claim 8 further comprising a swept frequency source conveyed in the borehole to produce the resonance of the fluid in the borehole; and wherein the processor is further configured to identify a frequency at which a difference between the first measurement and the second measurement is a maximum.

10. The apparatus of claim 9 wherein the swept frequency source further comprises a monopole source.

11. The apparatus of claim 9 further comprising a conveyance device configure to convey the swept frequency source into the borehole, the conveyance device being selected from: (i) a wireline, and (ii) a drilling tubular.

12. The apparatus of claim 8 wherein the first sensor comprises a geophone configured to measure the velocity of the formation and the second sensor comprises a flow rate sensor configured to measure the fluid velocity.

13. The apparatus of claim 8 wherein the processor is further configured to use a measured value of a first compressional wave in the formation, a second compressional waves in the formation, and a shear velocity of the formation to estimate the permeability.

\* \* \* \* \*